United States Patent [19]
Kramer et al.

[11] 3,729,895
[45] May 1, 1973

[54] CARTON LOADING APPARATUS

[75] Inventors: Franklin Kramer, Lexington; Albert W. Soeldner, Dedham; Joseph R. Paradis, Wayland, all of Mass.

[73] Assignee: LaTouraine-Bickfords Foods, Inc., Newton, Mass.

[22] Filed: July 6, 1971

[21] Appl. No.: 159,695

[52] U.S. Cl............................53/59 R, 53/74, 53/244, 198/31 AC, 214/6 D
[51] Int. Cl. .............................................B65b 57/20
[58] Field of Search.........................53/58, 59 R, 74, 53/78, 244; 214/6 D; 198/31 AC

[56] References Cited

UNITED STATES PATENTS

| | | |
|---|---|---|
| 3,512,336 | 5/1970 | Rosecrans........................53/244 X |
| 3,193,078 | 7/1965 | Amenta et al....................198/31 AC |
| 2,523,517 | 9/1950 | Potter..............................53/59 R X |

*Primary Examiner*—Travis S. McGehee
*Attorney*—Herbert W. Kenway et al.

[57] ABSTRACT

A machine for automatic three-dimensional pattern loading of pouch packages in cartons, counting the packages and sequentially ejecting loaded cartons. The packages move in single file on a conveyor between movable lateral positioning guides, falling off the end of the conveyor past a photocell detector and into a carton. Indexing of the guides and rocking of the carton are controlled by the detector, and ejection of the carton is controlled by a counter associated with the detector.

17 Claims, 12 Drawing Figures

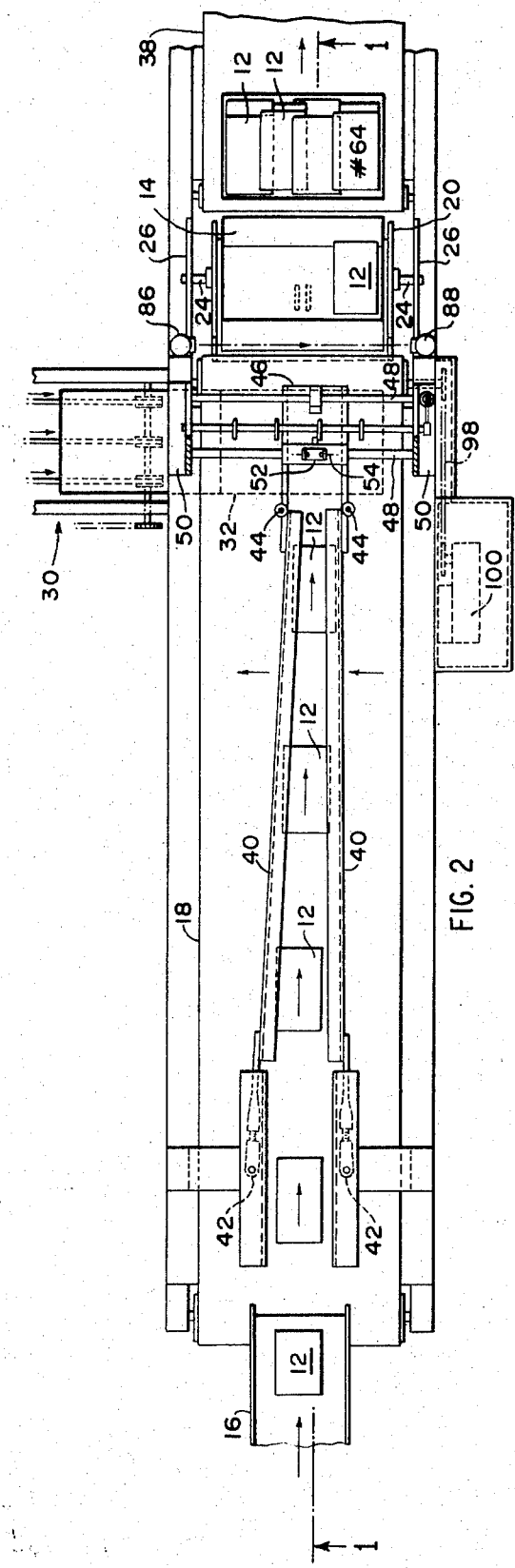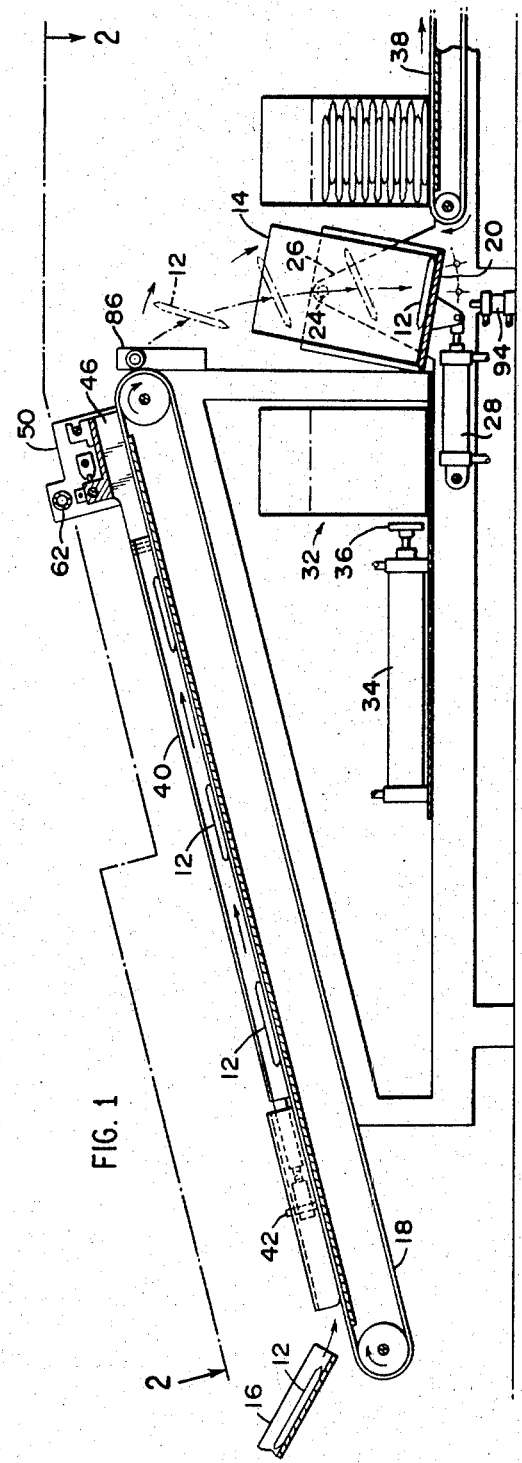

Patented May 1, 1973

INVENTORS
ALBERT W. SOELDNER
FRANKLIN KRAMER
JOSEPH R. PARADIS

BY Kenway, Jenney &
Hildreth

ATTORNEYS

Patented May 1, 1973

INVENTORS
ALBERT W. SOELDNER
FRANKLIN KRAMER
JOSEPH R. PARADIS

BY Kenway, Jenney &
Hildreth

ATTORNEYS

CARTON LOADING APPARATUS

BRIEF SUMMARY OF THE INVENTION

This invention relates generally to apparatus for uniform loading into containers in plural layers of similarly shaped elements. More particularly, it relates to apparatus for loading elements such as packages of food or other products into cartons or the like so as to pack or load the containers uniformly with minimal damage to the elements or packages.

Cartons and other types of containers have been loaded by a variety of means ranging from hand packing or loading to relatively complicated automatic loading methods. The method chosen depends on such factors as the nature of the elements to be loaded including their general shape, dimensions, structural rigidity and ability to withstand mechanical handling. The dimensions of the elements are considered with respect to both their uniformity from one element to the next and the relationship between the dimensions of any one of the elements and the dimensions of the carton or other container into which they are loaded.

The problems of loading with which this invention is primarily concerned are particularly acute when the individual elements to be loaded, while being of nominally uniform dimensions, are variable in shape or amorphous, as in the case of small bags or pouches filled with a material having no intrinsic shape or a shaped material of a delicate or yieldable nature. Specific examples occur, for example, in the food industry where it is necessary to load cardboard cartons each with an exact number of bags or other packages of granular or powdered products without damage to the contents or breakage of the package wrappers.

While hand packing produces satisfactory results when proper care and attention are employed, the labor cost is high and there is a possibility of errors in the numbers of elements loaded into each carton or container. The usual manual procedure for efficient loading is for the operator to grasp the elements singly and to place them in layers each comprising rows and columns of the elements within the carton or container. If the width and depth of the container are not whole multiples of the element dimensions it is frequently necessary to overlap the elements provided that they are of a suitable shape. Where the elements are of a delicate nature, as is frequently thecase with bags, pouches or wrappers containing fluid, powdered or granular food products or materials having similar consistency, care must be taken to avoid breakage of the wrappings and spillage of the contents.

A principal object of this invention is to provide automatic means for three dimensional pattern loading of elements such as pouch packages, bags and the like where problems such as the foregoing are prevalent. Hitherto, various automatic loading devices have been employed or proposed, many of which involve the use of suction cups, retractable fingers or other devices, which are frequently unsatisfactory because of breakage and spillage with attendant losses both in clean-up labor costs and in the value of lost, spilled, degraded or spoiled contents. Accordingly, another object of this invention is to avoid the use of such devices in the loading process.

A further object is to provide loading apparatus adapted to count the total number of elements or packages actually loaded into each container or carton, and to provide means operated by the counting device for ejecting filled containers and automatically presenting unfilled containers for loading.

A further object is to provide apparatus capable of loading elements in a pattern consisting of plural layers within the container, such pattern comprising rows in overlapping or adjacent relationship within each layer, with the elements in each row being overlapping or adjacent one another, in such manner that the container or carton is uniformly and efficiently filled. It is particularly desirable to be able to accomplish loading in patterns of this type where the elements comprise generally flat, delicate, amorphous bags or pouches of particulate material such as industrial coffee packs. Shingling or overlapping of such packs permits efficient loading of cartons, even though the packs may not be of precisely identical dimensions or of dimensions comprising integral fractions of the dimensions of the cartons.

The present invention comprises completely automatic means for accomplishing pattern loading within the foregoing requirements, with a precise count of loaded elements and with minimal handling thereof. The elements are conveyed in single file to a loading position over the container and drop by gravity into the container. Spacing of the elements in one lateral dimension of the container is accomplished by movable positioning guides adapted to cause the elements to reach different positions laterally of the conveyor at the end over the container. Lateral spacing of the elements at right angles thereto is accomplished by a rocking or tilting motion of the container. The elements are loaded singly with the elements of each row being loaded in succession and the plural rows of each layer also being loaded in succession. The operation is repetitive to form plural layers within the container. The elements are counted and the container is ejected when filled to the desired capacity.

BRIEF DESCRIPTION OF THE DRAWING

FIG. 1 is a longitudinal elevation in section of a preferred form of carton loading apparatus adapted for loading industrial coffee packages into cardboard cartons, as an exemplory application.

FIG. 2 is a plan view of the apparatus taken on line 2—2 of FIG. 1.

DETAILED DESCRIPTION

Figure 3:
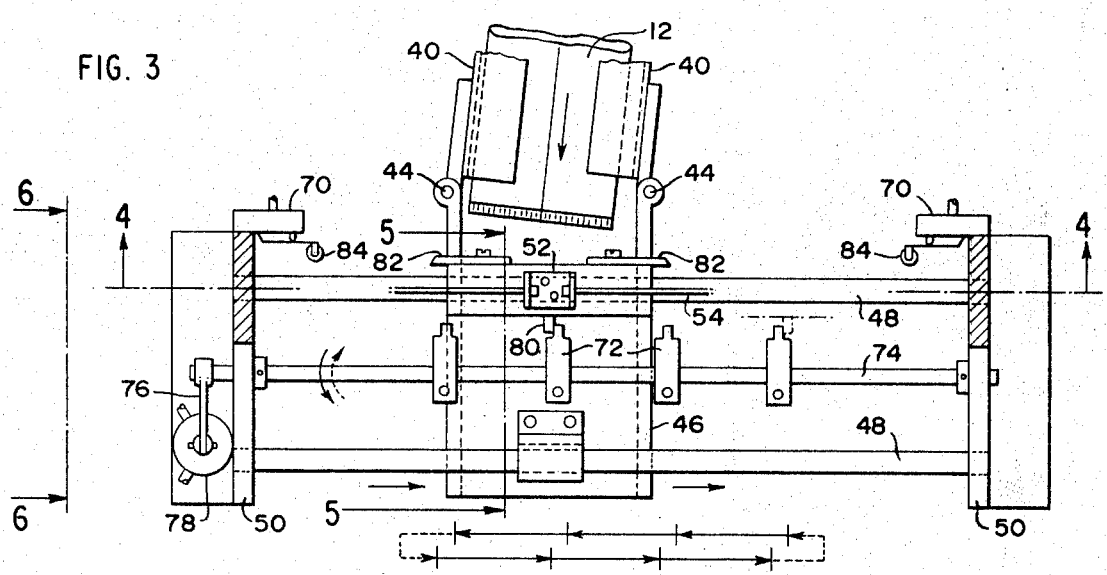
FIG. 3 is a detail plan view showing the indexer means for displacing the packages laterally of the conveyor.
Figure 4:
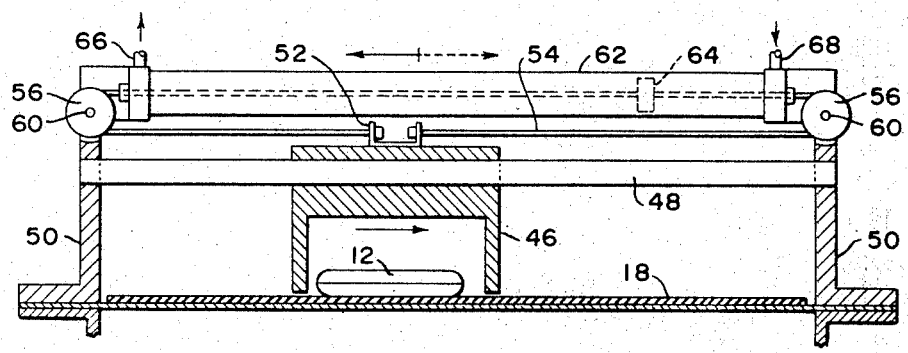
FIG. 4 is an elevation in section taken on line 4—4 of FIG. 3.

The drawings illustrate a particular preferred embodiment adapted for loading industrial coffee packs or packages 12 into a cardboard carton 14. Typically, each package contains 2 to 4 ounces of granulated roasted coffee beans, and is generally flat and rectangular in shape. The package may be formed on a commercially available "form, fill and seal" machine adapted to form a continuous web of flexible paper wrapping material into a sleeve, cutting off the sleeve and sealing the severed ends so formed at uniformly spaced intervals while filling the portions between the seals with measured quantities of coffee. Since such machines are commercially available and form no part of the present invention, it will suffice to state that the filled packages are delivered one at a time from the machine to the apparatus of the present invention from a chute 16, the packages being deposited on the lower end of a continuous lift conveyor belt 18.

Figure 7:
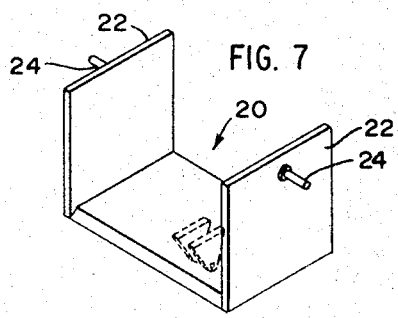
FIG. 7 is a view in perspective of the carton support.

The packages 12 as delivered to the conveyor belt 18 are of a delicate nature and may be broken if handled roughly in a manner that would tear the flexible paper wrapping material which is typically of relatively thin gauge. According to this invention, the packages are subjected to a minimum of handling and travel up the conveyor belt 18 to the opposite end where they fall by gravity into the carton 14 then situated in a receiving position. In this position the carton rests upon a rockable carton support 20 (FIG. 7) having integral side walls 22, the side walls having pivot pins 24 received in fixed triangular-shaped vertical supports 26. The carton support is pivotal about the axis of the pins 24 by means of a pneumatic rocker cylinder 28 having a plunger pivoted to a lower extremity of the support. The carton support has three positions, namely, a forward loading position shown in FIG. 1, a back loading position shown in FIGS. 8 and 12, and a horizontal ejection position illustrated in FIG. 9.

Referring to FIG. 2, empty cartons are fed to the machine by a gravity conveyor shown generally at 30 which continuously and yieldably urges the cartons in the direction of a standby position 32 beneath the conveyor belt 18. Directly beneath the belt 18 is an ejector cylinder 34 which actuates a carton ejector or pusher 36. The pusher 36 is in the retracted position shown in FIG. 8 while the carton 14 is being loaded with packages, and when a selected number of packages (sixty four in the disclosed embodiment) has fallen into the carton, it is rocked to the horizontal ejection position and the ejector 36 is propelled by pneumatic pressure against the empty carton in the standby position 32 to push it on to the support 20, thereby pushing the filled carton on to a continuously driven conveyor belt 38. Thereupon, the ejector 36 is retracted to allow another empty carton to reach the position 32 from the conveyor 30.

Figure 6:
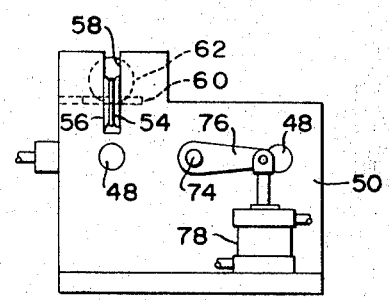
FIG. 6 is a detail side elevation taken on line 6—6 of FIG. 3.

As the packages 12 move in single file up the conveyor belt 18 they are restrained between converging longitudinal indexer guides 40. These guides are used for positioning the packages laterally of the conveyor belt by shifting or deflecting them in such a manner that successive packages reach different lateral positions on the conveyor at the end over the carton 14 in loading position. The indexer guides are preferably metal angle bars pivoted at their lower ends about fixed pins 42 on extensions of the frame of the machine. They are preferably held close to the surface of the belt 18 to prevent portions of the packages 12 from being squeezed between the guides and the belt, which might cause abrasion and breakage of the package wrappers. At their upper ends the guides 40 are pivoted by pins 44 on integral extensions of an inverted U-shaped guide member 46, the latter being transversely slidable on two fixed bars 48 extending transversely of the conveyor between fixed upright angle plates 50 forming parts of the frame of the machine. The guide member 46 has a bracket 52 secured to its upper surface, and a flexible wire or cable 54 is secured to this bracket, passing over pulleys 56. These pulleys are mounted in slots 58 on the plates 50 (FIG. 6) by means of pins 60 received in horizontal holes drilled in the edges of the plates. The wire 54 passes through both ends of a fixed pneumatic indexer cylinder 62 and is fastened to a plunger 64 in the cylinder. The indexer cylinder has end fittings 66 and 68 to which pneumatic pressure is alternately applied to index the guide member 46 alternately from side to side between limit positions defined by limit valves 70 (FIG. 3), as described further below.

Figure 5:
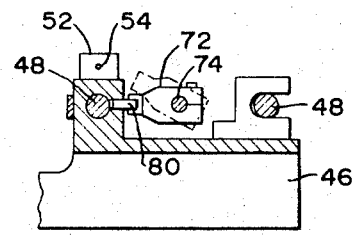
FIG. 5 is a detail elevation in section taken on line 5—5 of FIG. 3.

The movement of the guide member 46 from one side limit to the other is arrested sequentially by each of a plurality of equally spaced stops 72 fastened to a rotatably reciprocal transverse bar 74. The bar 74 has an end protruding through one of the side plates 50 and fastened to a ink 76 which is in turn fastened at its opposite end to the plunger of a pneumatic escapement cylinder 78. A pin 80 (FIGS. 3 and 5) is fitted into a hole drilled in the member 46 in position to interfere with the stops 72. Interference occurs in the position shown in full lines in FIG. 5 for one plunger position of the escapement cylinder, and noninterference results when the stops are in the position shown by broken lines in FIG. 5, corresponding to the opposite plunger position of the escapement cylinder.

A pair of limit plates 82 are fastened to the guide member 46 (FIGS. 3 and 5) in positions to actuate rollers 84 associated with the limit valves 70, at positions laterally outside of the stops 72.

Figure 8:
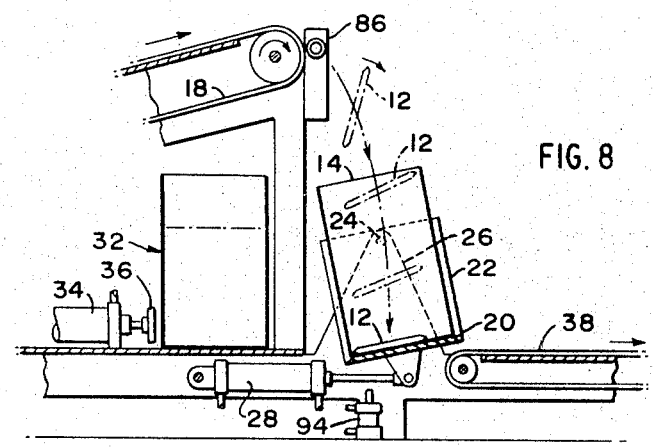
FIG. 8 is a longitudinal side elevation in section illustrating the carton support in one of its alternate positions for receiving the packages.

A light source 86 and photocell 88 are mounted on the front end of the machine, the light source having means to form a continuous beam oriented horizontally across the path of travel of the falling packages 12 as shown in FIG. 8. Thus each package interrupts the beam of light, regardless of its lateral position in relation to the conveyor belt 18. The photocell 88 is connected with an amplifier 90 through which each package pulse is used to actuate the escapement cylinder 78 momentarily, and also to advance a package counter 92. The counter, in turn, actuates the ejector cylinder 34 and also a parallel-connected leveler cylinder 94 having a plunger that may be projected into a position shown by broken lines at 96 for arresting the carton support plate 20 in the horizontal ejection position, as hereinafter more fully described.

The operation of the above-described loading machine is carried out with the conveyor belt 18 preferably in continuous motion, being driven by a chain or belt 98 (FIG. 2) and a suitable adjustable speed motor 100. The speed of the motor is adjusted with reference to the discharge rate of the form, fill and seal machine that drops the packages 12 on to the chute 16, whereby the packages have sufficient intervening space on the conveyor belt 18 to ensure that each package will produce a separate, distinct photocell impulse for proper operation of the counter 92 and other pulse-controlled elements.

Figure 12:
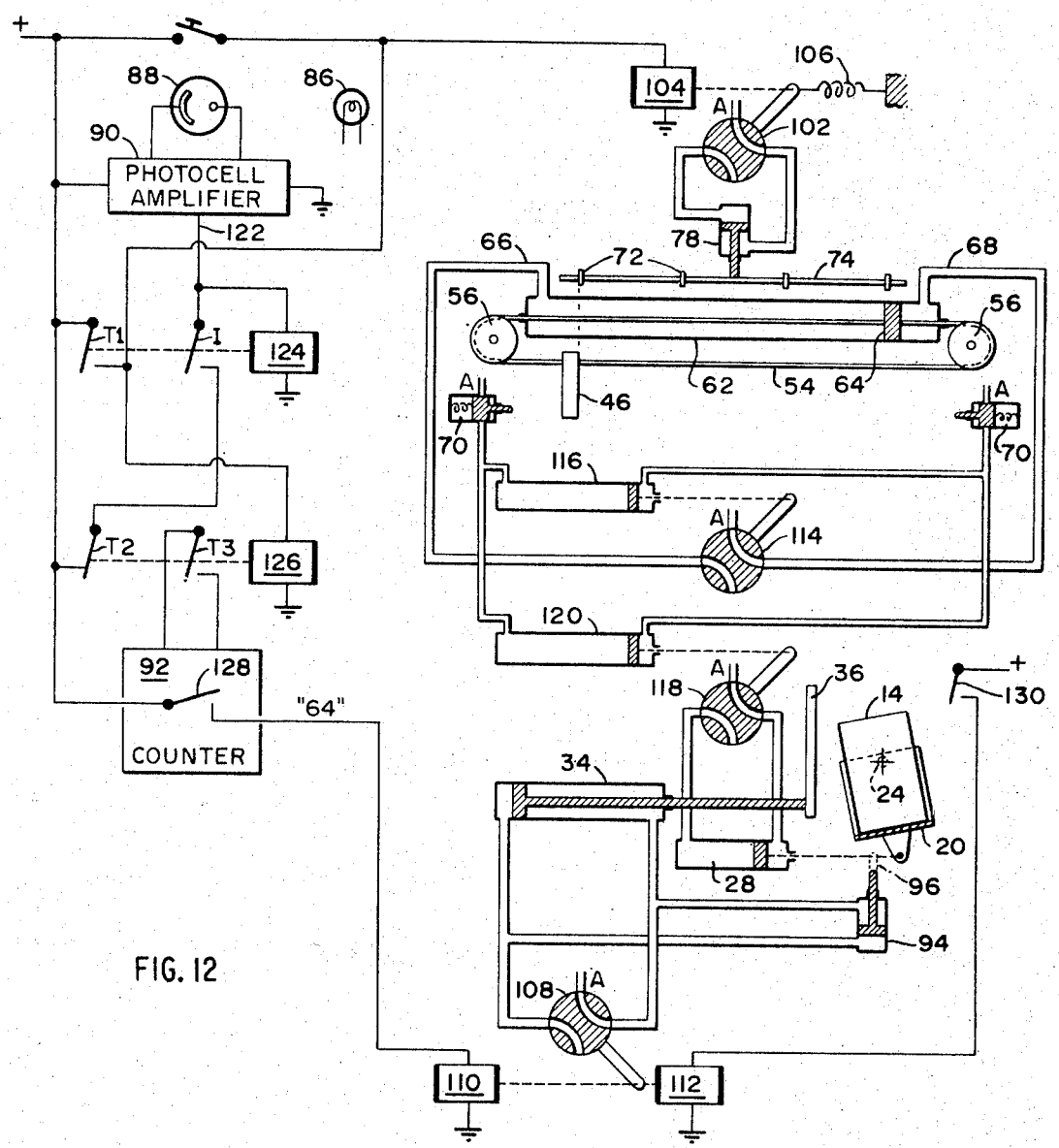
FIG. 12 is a schematic diagram of the electrical and pneumatic controls for operating the various parts of the loading apparatus in a prescribed sequence.

The operation may be understood by reference to the schematic drawing in FIG. 12. This drawing shows a four-way escapement valve 102 which is actuated by a solenoid 104 having a return spring 106 for sequential actuation of the escapement cylinder 78. A four-way ejector valve 108 is actuated by ejector solenoids 110 and 112 for operation of the ejector cylinder 34 and the leveler cylinder 94. A four-way indexer valve 114 has a pneumatic indexer valve operator 116, and a similar four-way rocker valve 118 has a pneumatic rocker valve operator 120 connected in parallel with the operator 116. On all of the valves shown in FIG. 12, connections marked with the letter "A" are assumed to be connected to a suitable source of compressed air or other fluid. Suitable connections for the exhaust of air or other fluid through the valves from the non-pressurized sides of the cylinders are also provided for the valves as shown schematically in the drawing.

The operation is initiated with a carton 14 on the support 20 rocked to the forward loading position as illustrated in FIG. 1 and with the guide member 46 at the stop 72 furthest to the left as viewed in FIGS. 3 and 12, being urged toward the right as viewed in these figures. The first package 12 moving up the conveyor belt 18 falls to the position represented in FIG. 10 as No. 1, producing an electrical impulse in the photocell 88, which is amplified by the amplifier 90 (FIG. 12), producing an output pulse on a lead 122 to energize a relay 124. This relay has a pair of instant make contacts I which close very quickly upon energization of the operating coil, and timed make contacts T1 which close after a short time delay. This relay is connected with a relay 126 having timed contacts T2 and T3, the former being break contacts and the latter being make contacts. Energization of the relay 124 instantly closes a holding circuit through the contacts I and T2, thereby forming a circuit from a lead marked + to ground through the operating coil. Any suitable source of electrical potential (not shown) is assumed to be connected between the lead + and ground, and it may be either direct or alternating current. Preferably, the source is 110-volt alternating current.

After a short time delay the contacts T1 close, thereby energizing the operating coil of the relay 126 and the operating solenoid 104 of the escapement valve 102. After an additional brief time period the contacts T2 and T3 are operated. Closure of the contacts T3 completes a circuit in the counter 92, thereby causing the counter to advance one step. Opening of the contacts T2 opens the holding circuit of the relay 124, deenergizing that relay, and when the contacts T1 open the relay 126 and the solenoid 104 are also deenergized.

In the illustrated embodiment the counter is a conventional, commercially available unit and in this case it is set with the value 64, whereby upon a count of 64 normally open contacts 128 in the counter are briefly closed to energize the ejector solenoid 110. The operations resulting therefrom are described further below.

The momentary energization of the solenoid 104 as described above produces a rocking motion of the bar 74 through actuation of the escapement cylinder 78. It is assumed that at this time the indexer valve 114 is in the position shown in FIG. 12, thereby urging the guide member 46 toward the right, and therefore the guide member advances toward the right until it reaches the next stop 72.

Figure 10:
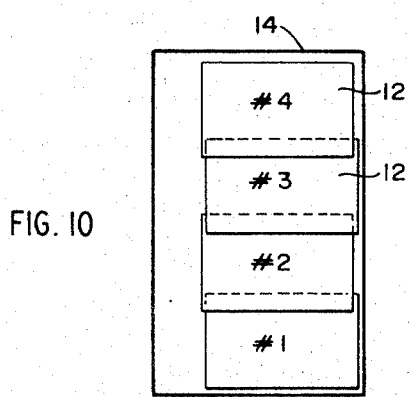
FIGS. 10 and 11 are plan views illustrating the sequence of loading packages into the carton.

The foregoing steps are repeated for each package that interrupts the light beam until the guide member 46 reaches the last stop 72 and the corresponding package falls to the position shown by No. 4 in FIG. 10. At this time the rocking of the bar 74 releases the guide 46 and allows it to approach and ultimately to actuate the right-hand limit valve 70, thereby moving the indexer and rocker valve operators 116 and 120 toward the left as viewed in FIG. 12. This reverses the direction of the indexer cylinder operation and allows the guide member 46 to move until it is arrested by the same stop 72 from which it has just been released. The actuation of the rocker valve 118 causes the carton support 20 to rotate to its back position illustrated in FIG. 12.

Figure 11:
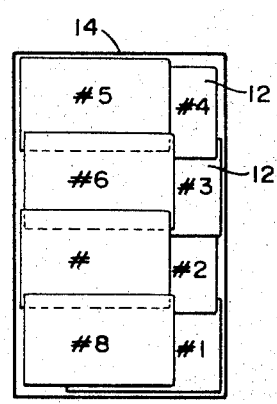

As the result of the foregoing operations the next four packages fall to the positions labeled No. 5 to No. 8 in FIG. 11. After the eighth package falls in place, the indexer cylinder and rocker cylinder are again reversed and another layer of packages is located in the carton in the manner previously described.

Figure 9:
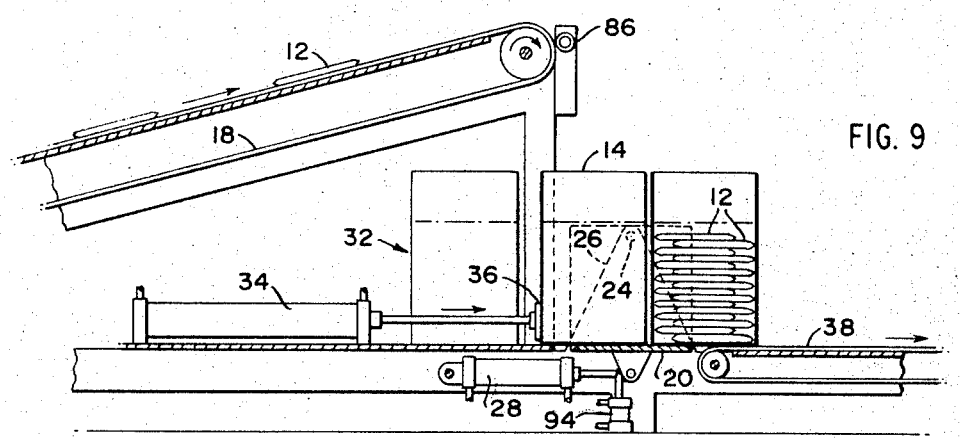
FIG. 9 is a longitudinal elevation in section showing the carton ejector and its operating cylinder.

The trajectory of each of the packages 12 is approximately as shown in FIG. 8 as it falls from the conveyor belt 18 to the carton 14. The inertial forces are such that the package flips over with the side which is uppermost on the conveyor belt being the lower side in the final position in the carton. Since the packages are filled with granulated contents and have flexible material comprising the wrapper, there are certain variations in the precise paths of travel, and the precise peripheral outlines of the packages will differ in the usual case for like reasons. Notwithstanding these variations, this invention provides efficient, uniform loading of the carton through a "funnel action" wherein the inclined walls of the carton, especially the forward and back walls that extend transversely of the conveyor belt, act as guides and limits to the movement of the packages as they fall in place. Thus each row of four packages is aligned against one of the walls, and the next row is aligned against the opposite wall. Moreover, the rows overlap as shown in FIG. 9, and the packages within each row overlap as shown in FIGS. 10 and 11. For this reason, it is apparent that the invention will accommodate substantial variations in the package sizes for loading in a carton of given dimensions, whether or not such carton has dimensions that comprise multiples of the package dimensions. It will be seen that the invention thereby provides ideal efficiency in the loading of packages of given dimensions in cartons of other given dimensions.

The loading of successive rows of packages, in which each two successive rows may be viewed as forming a "layer" of packages, continues until the eighth layer is completed, thereby advancing the counter 92 to the 64 position in which the contacts 128 are closed, energizing the ejector solenoid 110. This causes movement of the ejector valve from the position illustrated in FIG. 12 to the opposite position, applying pneumatic pressure to the ejector cylinder 34 and the leveler cylinder 94 to advance their plungers to the positions opposite from those illustrated in the drawing. The same package impulse also results in actuation of the left-hand limit valve 70 which actuates the rocker valve 118 to the position shown in the drawing, and the carton support 20 is pivoted from the back position toward the forward position until it is arrested by the plunger of the leveler cylinder 94 in the horizontal ejection position illustrated in FIG. 9. The ejector 36 then reaches and pushes the carton in the standby position 32 against the full carton 14, removing the latter from the support 20 on to the conveyor 38, which is continuously driven and moves it away from the machine.

The ejector 36 moves until it eventually reaches and closes contacts 130, thereby energizing the ejector solenoid 112. This causes reversal of the connections to the ejector valve 108, retracting the ejector cylinder 34 and leveler cylinder 94 back to the positions shown in FIG. 12. This allows the support 20 to rock to the forward loading position. As soon as the ejector 36 is retracted an empty carton is allowed to move from the conveyor 30 (FIG. 12), reaching the position 32 for loading on the carton support 20 when the carton then in position on the support has been filled by the next group of packages.

It will be noted that this invention provides considerable flexibility as to the number and sizes of packages that may be loaded into cartons. This includes the ability to select various counts in the counter 92 corresponding to the desired total number of packages per carton, and the ability to space the stops 92 on the bar 94 to produce different numbers of packages per row across the width of the carton.

Other variations in the structure and arrangements of the parts may be incorporated by the use of techniques familiar to those skilled in this art, once the principles of this invention have been understood.

We claim:

1. Means to load plural elements into a container, including the combination of
    a single continuously moving conveyor,
    means to deposit a line of said elements for continuous movement in single file on and toward one end of the conveyor,
    means to support the container in position to receive the elements as they reach and fall from said end of the conveyor,
    guides over the conveyor actuable to cause said elements to reach different positions laterally of the conveyor at said end thereof,
    a detector adapted to produce a signal upon passage of each element past a position in predetermined longitudinal relation to the conveyor, and
    indexer means operated by a signal produced by one element to actuate the guides to displace a following element laterally of said one element at said end of the conveyor.

2. The combination according to claim 1, in which the guides comprise elongate pivotal elements.

3. The combination according to claim 1, in which the indexer means have provision to reverse the lateral direction of the guides automatically after reaching a lateral limit position.

4. The combination according to claim 1, in which the indexer means include means for urging the guides in a direction lateral to the conveyor and escapement means having plural stop positions thereon for arresting the guides.

5. The combination according to claim 1, in which the indexer means include a reversible fluid pressure actuated cylinder having a piston, a member having connections to the piston and guides, and escapement means having plural stop positions thereon for arresting said member.

6. The combination according to claim 5, in which the indexer includes limit means operable by said member in positions laterally outside of the stop positions to reverse the fluid connections to the cylinder.

7. Means to load plural elements moving in single file on a conveyor into a container located beneath an end thereof, including the combination of
    guides over the conveyor actuable to cause said elements to reach different positions laterally of the conveyor at said end thereof,
    a detector adapted to produce a signal upon passage of each element past a position in predetermined longitudinal relation to the conveyor,
    indexer means operated by a signal produced by one element to actuate the guides to displace the following element laterally of said one element at said end of the conveyor,
    a container support, and
    means to rock the support periodically about an axis transverse to the direction of the conveyor.

8. Means to load plural elements moving in single file on a conveyor into a container located beneath an end thereof, including the combination of
    guides over the conveyor actuable to cause said elements to reach different positions laterally of the conveyor at said end thereof,
    a detector adapted to produce a signal upon passage of each element past a position in predetermined longitudinal relation to the conveyor,
    a container support, and
    indexer means operated by a signal produced by one element to actuate the guides to displace a following element laterally of said one element at said end of the conveyor, said indexer means including a reversible fluid pressure actuated cylinder having a piston, a member having connections to the piston and guides, escapement means having plural stop positions thereon for arresting said member, and limit means operable by said member in positions laterally outside of the stop positions to reverse the fluid connections to the cylinder and to rock the support about an axis transverse to the direction of the conveyor.

9. Means to load plural elements moving in single file on a conveyor into a container located beneath an end thereof, including the combination of
    guides over the conveyor actuable to cause said elements to reach different positions laterally of the conveyor at said end thereof, a detector adapted to produce a signal upon passage of each element past a position in predetermined longitudinal relation to the conveyor, indexer means operated by a signal produced by one element to actuate the guides to displace a following element laterally of said one element at said end of the conveyor, a counter connected to the detector for counting the signals, and an ejector operable by the counter upon reaching a predetermined count to eject the container.

10. The combination according to claim 7, in which the indexer means have provision to reverse the lateral direction of the guides and to rock the support automatically after reaching a lateral limit position.

11. The combination according to claim 9, including a container support and means to rock the support periodically about an axis transverse to the direction of the conveyor, the ejector being operable to push the container from said support.

12. The combination according to claim 7, in which the support is rocked to a position with the bottom of the container at an acute angle to the horizontal for receiving the elements.

13. The combination according to claim 12, in which the elements fall from said end of the conveyor into the container with a flipping movement.

14. The combination according to claim 13, in which the elements have sufficient longitudinal velocity upon reaching the container to slide therein until arrested by an inclined wall thereof.

15. The combination according to claim 1, in which the elements fall from said end of the conveyor into the container, the detector being actuated by a falling element to produce a signal.

16. The combination according to claim 15, in which the detector is photocell-operated.

17. The combination according to claim 9, including a container support, means to rock the support about an axis transverse to the direction of the conveyor, and means operable by the counter upon reaching said predetermined count to hold the support in a position for ejection of the container, the ejector being operable to push the container from the support.

* * * * *